United States Patent [19]

Tangorra

[11] Patent Number: 4,595,388
[45] Date of Patent: Jun. 17, 1986

[54] DRIVING BELT
[75] Inventor: Giorgio Tangorra, Monza, Italy
[73] Assignee: Industrie Pirelli S.p.A., Milan, Italy
[21] Appl. No.: 601,280
[22] Filed: Apr. 17, 1984
[30] Foreign Application Priority Data
Apr. 18, 1983 [IT] Italy .................................. 20656 A/83
[51] Int. Cl.⁴ .............................................. F16G 1/26
[52] U.S. Cl. ..................................... 474/204; 474/202
[58] Field of Search ................. 474/204, 249, 260–262, 474/268, 202

[56] References Cited
U.S. PATENT DOCUMENTS

| | | | |
|---|---|---|---|
| 3,181,690 | 5/1965 | Jenkins | 474/262 |
| 3,212,627 | 10/1965 | Beebee | 474/262 |
| 3,416,383 | 12/1968 | Jensen et al. | 474/261 |
| 3,498,684 | 3/1970 | Hallaman | 474/204 |
| 3,546,057 | 12/1970 | Jenkins | 474/262 |
| 3,577,794 | 5/1971 | Kerfoot | 474/204 |
| 3,941,005 | 3/1976 | Gardiner, III et al. | 474/262 |

FOREIGN PATENT DOCUMENTS 409626 2/1945 Italy ..................................... 474/204
5354 of 1893 United Kingdom ................. 474/204

Primary Examiner—Stephen J. Novosad
Assistant Examiner—Bruce M. Kisliuk
Attorney, Agent, or Firm—Stevens, Davis, Miller & Mosher

[57] ABSTRACT

A belt for transmitting motion between two pulleys comprising an annular body of elastomeric material, at least a plurality of openings aligned in the longitudinal direction of the belt for engaging with corresponding protuberances on the pulleys, continuous elongated elements resistant to traction and directed in the longitudinal direction of the belt, and reinforcing elements directed along two directions, symmetrically inclined to each other with respect to the longitudinal direction of the belt.

12 Claims, 13 Drawing Figures

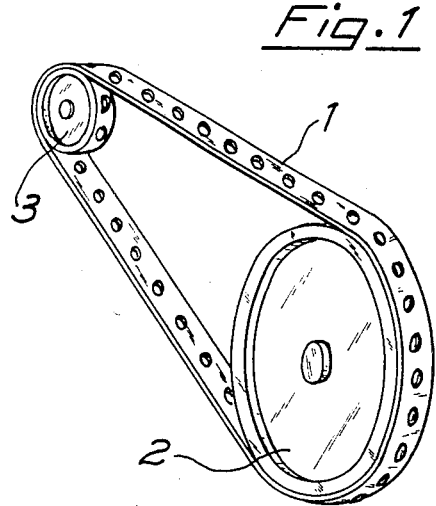
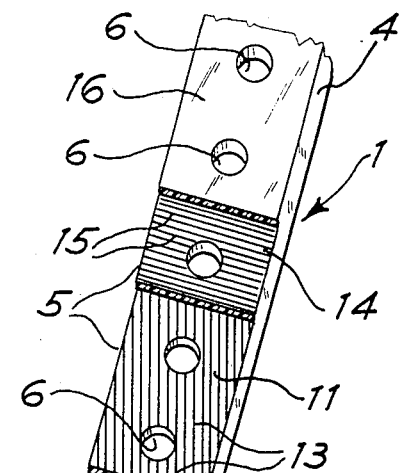
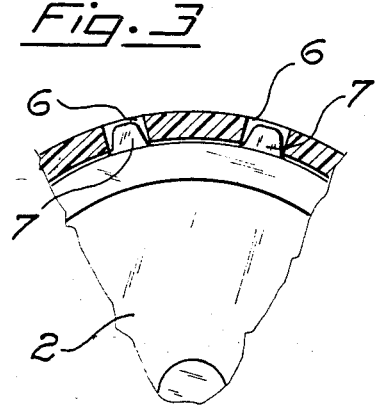
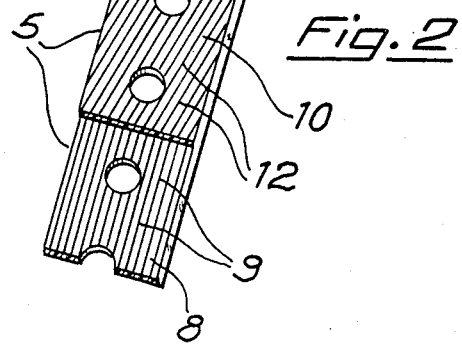

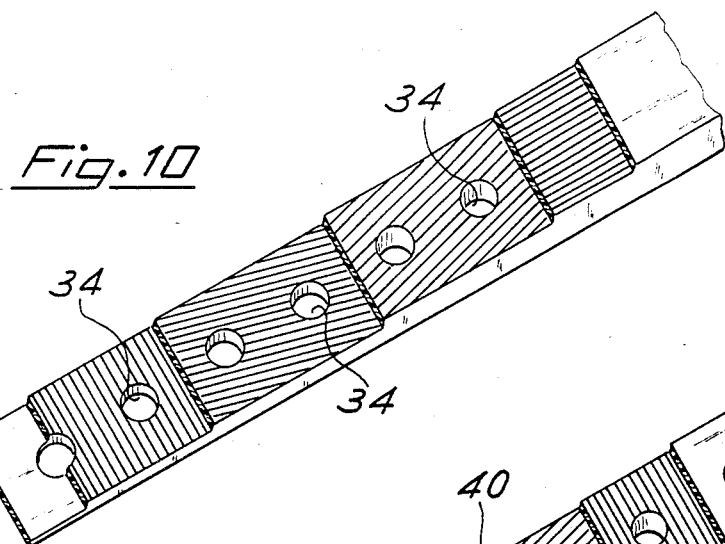
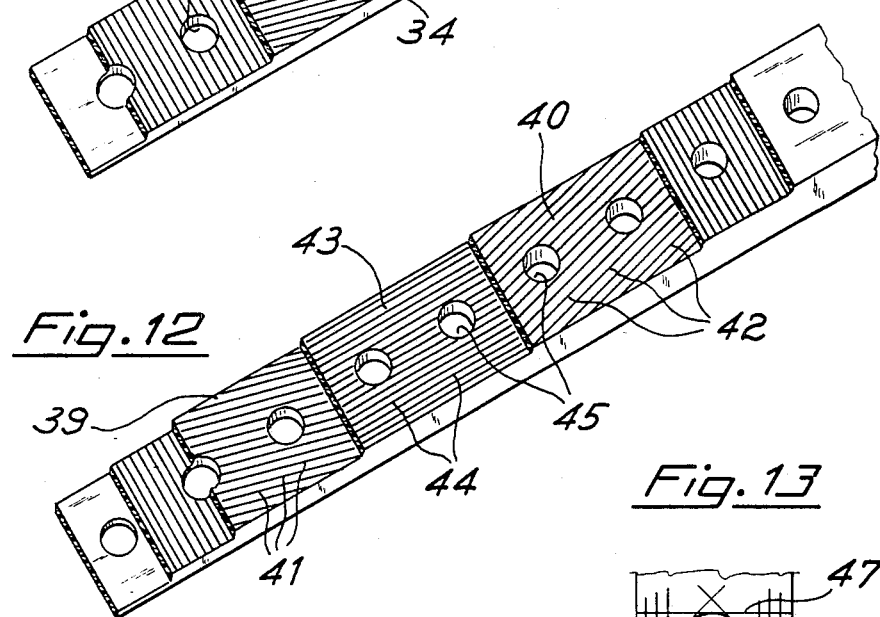
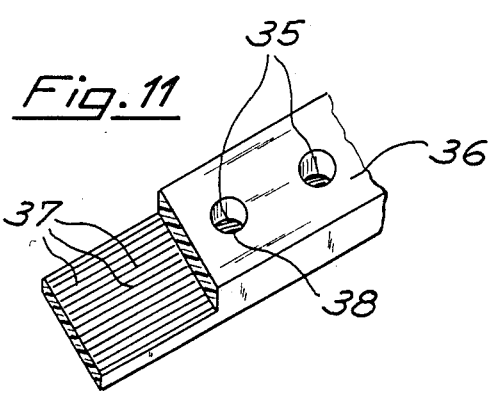
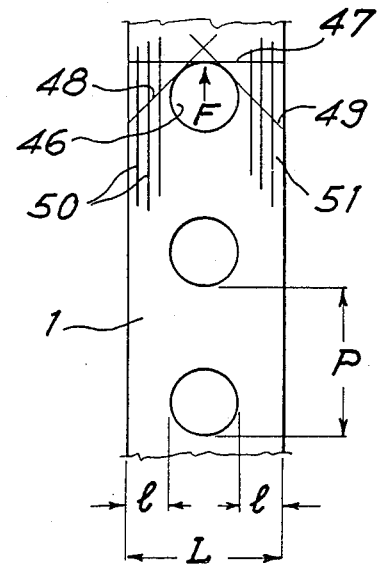

DRIVING BELT

The present invention relates to a belt for transmitting motion between two pulleys; and more particularly, it relates to a new belt comprising an annular body of elastomeric material or the like reinforced with suitable elements arranged around openings provided in the belt body, and adapted to engage with corresponding protuberances on the pulleys forming part of the transmission.

As well known, driving belts having a body of an elastomeric material are essentially of three types and are identified according to the shape as flat belts, V-belts, and toothed belts. Each type of belt has its own field of application.

In particular, the flat belts have the characteristic of being very flexible so that they can be used with a high ratio of transmission. Unfortunately, such belts transmitting power to the pulleys through friction have performances limited by the forces of friction, and obviously they do not have synchronous motion.

The V-belts, as compared to flat belts, offer the advantage of transmitting a higher power through a particular wedging action of the flanks of the belt between and against the faces of the pulleys in order to increase engaging the whole with a more reduced section of the belt. However, V-belts are less suitable than flat belts for high speeds, and owing to their greater thickness they are subjected to greater losses of power due both to the bending deformations and to the transversal compression suffered as they wind around the pulleys.

The toothed belts, besides having the synchronous property, transmit power through teeth of elastomeric material projecting from the annular body and engaging on corresponding spaces on the pulleys; therefore, such toothed belts are not limited by friction as in the case of the other belts previously mentioned.

However, in some circumstances, especially under severe stresses, there can take place the drawback of the skipping phenomenon; i.e., the skipping of the belt teeth with respect to the spaces on the pulleys, with consequent loss of the proper transmission of motion and with consequent unacceptable drawbacks.

Therefore, in such belts it is necessary to apply between the two pulleys a tensioning force sufficient to avoid such skipping. Such tension must be rather high in order to guarantee the compensation of the relaxations and the wear of the belt structure with time.

Further, in some applications it is possible with the toothed belts to note a certain noise.

Then again, it is to be noted that the weight of the toothed belts can cause critical vibrations even at speeds not very high.

A drawback common to all belts of the synchronous type is further the precision with which the pulleys must be aligned in order to avoid ruptures and springing out of their seat. In the case of belts having a toothing provided on both faces, those skilled in the art well know the difficulties of manufacture and the criticality of their adjustment and operation.

Several improvements have been proposed for belts of the cited types. However, there have been reached certain limits apparently very difficult to overcome so that it does not seem possible to increase any further the coefficient of friction between the flat belts; to increase considerably the wedging action in the races of the pulleys of the V-belts; and to go beyond the use of particular elastomeric compounds for the teeth of the toothed belts. But, while admitting the possibility of overcoming all the present difficulties in each individual type of belt, yet it has not seemed possible to collect in a single belt all the advantages offered by the conventional belts.

Therefore, the present invention aims at providing a belt for the transmission of motion between two pulleys which is able to solve simultaneously all the cited drawbacks, and which is furthermore very flexible and lightweight, subjected during movement to a very low heating of the elastomeric material, and substantially indeformable to thereby guarantee a proper and efficient transmission of motion.

The object of the present invention is a belt for transmitting motion between two pulleys, comprising an annular body of elastomeric material, said belt being characterized in comprising a flat-shaped annular body reinforced with continuous and flexible elongated elements, resistant to traction, directed in the longitudinal direction of the belt, at least a plurality of openings being provided in said annular body aligned in the longitudinal direction of the belt to engage with corresponding protuberances on the pulleys, said openings engaging partially the width of said belt, said annular body being provided with reinforcing elements directed parallel to one another in a first direction inclined with respect to the longitudinal direction of the belt and further reinforcing elements directed parallel to one another in a second direction inclined with respect to the longitudinal direction of the belt in a substantially symmetrical way with respect to the first direction.

Therefore, the transmission of motion takes place in consequence of the engaging of the openings provided on the belt with the corresponding protuberances or teeth of a corresponding shape provided on the two pulleys making up part of the transmission.

The stresses transmitted, for instance by the driving pulley to the belt, are determined by the contact of the protuberances on the pulleys against the portions of the contours of the corresponding openings wherein said protuberances are inserted.

These stresses do not modify the geometry of the contours of the openings since the reinforcing elements inclined to one another constitute an indeformable reinforcing structure closely arranged around said contours; since said elements inclined to one another define in the annular body two directions of particular tension resistance and since said elements may be suitably inclined with respect to the longitudinal ones, the stresses are directly transmitted by the contours of the opening to the longitudinal continous elements forming an anchoring system adapted to absorb completely all the stress transitted by the pulleys on or to the openings of the belt.

As shown by the present invention, all the elastomeric material of the belt, i.e., the whole annular body, has only the function of supporting the whole reinforcing structure and this is contrary to what happens, for instance, in toothed belts where a good part of the elastomeric material and the teeth projecting with respect to the annular body, have the essential function of participating in the engaging operation with the metallic teeth of the pulleys.

Consequently, the belt according to the present invention giving only to the reinforcing structure formed by the cited elements the exchange of the interaction stresses between belt and pulleys during motion, protects all the elastomeric material from cyclic stresses determining in practice the absence of heating in the annular body of the belt and a longer lifetime of the belt itself.

Furthermore, the belt according to the present invention is characterized by high flexibility; in fact, the whole reinforcing structure is made up substantially of elements in the form of cords directed longitudinally with respect to the belt or in the form of cords or discontinuous fibers directed in two directions inclined to each other with respect to the longitudinal direction of the belt. Consequently, said elements are reinforcing elements having generally reduced transversal dimensions and the annular body of the belt, having to carry out the cited function of supporting said reinforcements, will have consequently a reduced section, substantially somewhat as in flat belts.

However, the flexibility of the belt according to the present invention is still higher with respect to that of the flat belts, since the belt is devoid of material in correspondence with the openings adapted to engage with the teeth of the pulleys forming part of the transmission.

Owing to its high flexibility, the present belt can be easily adapted to any bending radius of the pulleys with which it is associated.

The light weight is a characteristic still more marked in the belt according to the present invention than in all the other cited belts, and this in turn means a considerable reduction of vibrations and therefore an improvement in the noiselessness of the whole transmission.

Furthermore, the belt according to the present invention can be used for transmitting any power whatsoever because not bound (as in the flat belt and V-belt) by the limits given by the coefficients of friction and by the wedging action between the pulleys achievable up to now.

In fact, here the transmission of power takes place as in the toothed belts or in the chains, i.e., on the basis of a meshing, in this case between the openings provided in the annular body of the belt and the teeth or protuberances arranged on the pulleys.

In substance, here, the values of power that can be transmitted are linked to the resistance capacity of the reinforcing structure embedded in the annular body, i.e., to the particular resistance of the elements arranged along two directions with angles of inclination specially indicated later on in the specification.

The present belt, although having a synchronous operation, i.e., without any sliding with respect to the pulleys, differs clearly and advantageously both from toothed belts and from chain belts.

In fact, with respect to the known toothed belts, the present belt has the advantage of lack of the polygonal effect in the contact with the pulleys and of having an indeformable structure, practically operating without pre-tensioning and also with little need for alignment of the pulleys. With respect to the chain belt, the present belt has the advantage of having a transmission suitable for operation at high speeds with pulsating loads, completely devoid of the noise typical both of the chain belts and of the toothed belts and without the need for a lubricating operation.

The present invention will be still better understood by the following detailed description given by way of nonlimiting example with reference to the figures of the accompanying drawings, in which:

FIG. 1 shows in a lateral perspective view the belt associated with the relative pulleys forming a part of the transmission;

FIG. 2 shows in a perspective view the disposition of the reinforcing structure in the elastomeric body of the belt, with parts broken away;

FIG. 3 shows in a partial longitudinal section a portion of the belt associated with the driving pulley;

FIGS. 4, 5 and 6 show different embodiments of the reinforcing structure embedded in the annular body of the belt;

FIGS. 10, 11 and 12 show further alternative embodiments of the belt in perspective views with parts broken away; and FIG. 13 shows in a top view some particulars of the belt with parts broken away.

Figure 5:
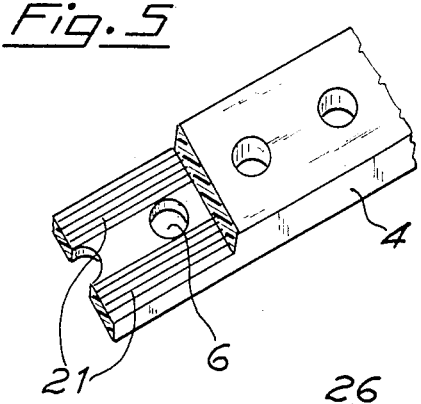

By way of general example, FIG. 1 represents the driving belt 1 associated with the two pulleys 2 and 3, which are, respectively, driving and driven pulleys.

The belt 1 comprises (FIG. 2) a flat-shaped annular body 4 of elastomeric material or the like, embedding a resistant structure 5 and a plurality of openings 6 passing through the annular body 4 to engage with corresponding protuberances 7 on the pulleys, as shown in FIG. 3 for simplicity, with respect to only one pulley 2.

The material forming the annular body 4 may be, in one embodiment, an elastomeric material of the polyurethane type.

In the present specification, the word "opening" means any perforation whatsoever through the thickness of the annular body 4 having a desired contour; for instance, an opening having a circular or an elliptical or even a non-curvilinear profile. Said openings engage partially the width of the belt and form areas delimited by the elastomeric material, both longitudinally and transversely.

Reference will now be made to an annular body 4 comprising a plurality of substantially circular openings 6 aligned one after the other in the longitudinal direction of the belt 1 and in central position with respect to the belt, as shown in FIG. 2.

In like manner, the term "protuberance" means any radial projecting part of the pulleys whatsoever, with the proviso that it has a shape and a profile suitable to penetrate and therefore to engage with the cited "openings". Said protuberances, for the sake of simplicity, will be indicated hereinafter as "teeth" of the pulleys.

The reinforcing structure 5 is embedded in the annular body 4 of elastomeric material; for instance, in some applications having a thickness of 4–5 mm.

In its more general aspects, however, said reinforcing structure 5 comprises a first layer 8 provided with a plurality of flexible and continous elongated elements 9, resistant to traction, parallel to one another and directed according to the longitudinal direction of the belt, at least two further layers 10 and 11 provided with reinforcing elements arranged parallel to one another in each layer and crossed with respect to those of the adjacent layer.

The reinforcing elements of the layers 10 and 11 are symmetrically inclined with respect to the longitudinal direction of the belt with an angle less than 50°.

Preferably, the reinforcing elements are inclined with angles between 10° and 45°.

According to some particular embodiments, the angles formed by the directions in which the reinforcing elements are inclined with respect to the longitudinal direction of the belt may be according to two different examples, respectively, 15° or 35°.

In the embodiment shown in FIG. 2, the reinforcing elements of the two layers 10 and 11 are flexible and continuous elongated elements 12 and 13, resistant to traction, arranged parallel to each other in each layer but crossed with respect to those of the adjacent layer.

The expression "flexible elongated elements" means elements in the form of cords or of monofilaments, substantially inextensible, of various materials; for instance, textile material or elements in the form of thin metallic wires. In particular, there are included in the cited definition glass fibers; aramide (wholly aromatic polyamide) fibers more specifically known as Kevlar fibers; polyester fibers; nylon fibers; or fibers of various textile materials as usually used in the known driving belts; or felted materials with high orientation.

In particular, applications adapted to transmit high power to the reinforcing structure 5 can also comprise a further layer 14 of elastomeric material provided with said flexible elongated elements 15, resistant to traction, arranged in a continuous manner transversely with respect to the longitudinal direction of the belt. A sheet of elastomeric material 16 can also be placed over the layer 14.

The inner part of the belt adapted to come into contact with the pulleys, or all around the opposite face, may comprise an anti-abrasive covering usually in the form of a fabric. Preferably, said anti-abrasive covering comprises two fabrics doubled together with the interposition of a layer of elastomeric material; the outermost fabric may be a self-lubricating fabric, as mentioned in Italian Pat. No. 864,204 (corresponding to U.S. Pat. No. 3,621,727). In one example, said fabrics are nylon rubberized fabrics.

As an alternative to that just-mentioned, the anti-abrasive covering instead of being a fabric, may make use of compounds felted, for instance with polyester, nylon, or Kevlar and the like.

More particularly, the disposition of said covering on the opposite faces of the belt permits, upon making the perforations on the annular body 4 to obtain the openings 6, the introduction of small fringes or thin strips of said fabrics toward the inside of the opening themselves, causing thus an adhesion of said thin strips to the inner walls of the openings. In this way there is advantageously favored the release in operation of the tooth of the pulleys from the openings of the belt and the reduction or the elimination of all the wear phenomena on the walls of the belt opening caused by the release of the tooth.

According to still another embodiment, the belt comprises continuous and flexible elongated elements, resistant to traction, arranged in a central plane at one-half of the thickness of the annular body; said longitudinal elements being oriented in the longitudinal direction of the belt. In a position substantially symmetrical with respect to said central plane, there are disposed all the further layers represented in FIG. 2.

This embodiment is suitable for coupling both faces of the belt on corresponding pulleys forming part of the transmission.

In this embodiment, the openings of the belt have a wider section at the belt faces and a smaller section at the central plane at one-half of the thickness.

In this way, the light compression condition to which the innermost layer of the belt is subjected when it is wound around the pulley, and the consequent small reduction in the section of the area of the opening provided on the belt face in contact on the pulley, is compensated by the greater starting dimension of the section of the opening; the section of the opening on the central plane at one-half the thickness of the belt does not change its contour, since the section of the opening is arranged on the neutral axis of the resistant section of the belt.

Therefore, also in this embodiment, there is a condition of perfect engaging between the openings 6 of the belt and the teeth 7 of the pulley.

In a further alternative embodiment shown in FIG. 4, the belt comprises a structure whose layers 17 and 18, having cords 19 and 20 inclined in directions crossing each other, are placed side-by-side and not as shown in FIG. 2, in which the layers 10 and 11 are adjacent in respect of their inner faces.

In this case, the resistant structure takes a herringbone shape, completely corresponding to that of FIG. 2 for the reinforcement around the openings 6.

According to still further embodiments, the structure 5 may comprise more than one pair of layers of cords crossing one another; for instance, two pairs of layers with the angle of inclination of the cords equal with respect to the longitudinal direction of the belt, or for instance a first pair comprising cords crossed and inclined at 35° with respect to the longitudinal direction of the belt and a second pair comprising cords crossing one another in the two layers and inclined at an angle of 45° with respect to the longitudinal direction of the belt.

FIG. 5 shows a belt whose longitudinal elements 21 are arranged only in lateral position with respect to the openings 6; also in this case, the reinforcing structure placed around the openings 6 corresponds to that represented in FIGS. 2 and 4. In fact, the elements 21 disposed in lateral position with respect to the openings 6 constitute the system to which the part of the reinforcement arranged around the opening is anchored.

Figure 6:
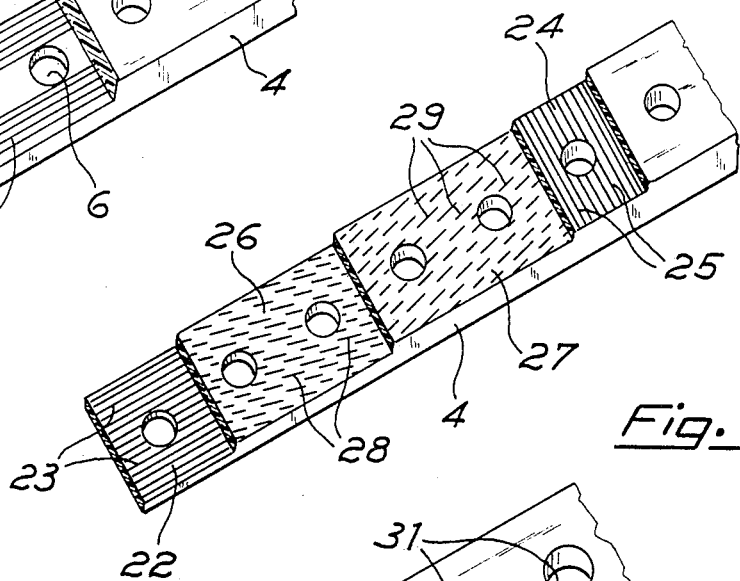

The belt shown in FIG. 6 is similar to that shown in FIG. 2, comprising an elastomeric annular body 4 embedding a resistant structure.

In this embodiment, there is also a first layer 22 having longitudinal cords 23 and a layer 24 having cords or transversal reinforcing elements 25. However, the intermediate layers 26,27 comprise, as reinforcing elements in the two layers, a plurality of discontinuous fibers 28 and 29, indicated with dashed lines, oriented in the elastomeric compound along two main directions inclined to each other in the two layers in the same way as are the cords 12 and 13 of FIG. 2.

These discontinuous fibers of limited length may be of a mineral type; for instance, glass fibers or textile material; for instance, according to a preferred embodiment, Kevlar fibers embedded and suitably directed in a compound of elastomeric material may be employed.

In some applications, said Kevlar fibers may have lengths between 2 and 15 mm and a diameter of about 0.1 mm.

The percentage weight of the fibers with respect to the total weight of the compound forming each layer 26 or 27 may be betwen 5% and 10%.

The modulus of traction of said fibers is the same as that of steel.

Preferably, the elastomeric compound is based on neoprene rubber. Each layer is prepared according to per se known techniques in conformity with which a compound comprising fibers dispersed throughout is transformed through an extruding or calendering operation, into a flat shape wherein the Kevlar fibers are oriented parallel to the greater direction of the profile, and subsequently cut in a manner well known to form layers with fibers directed along the desired direction.

The belt of FIG. 6 is equivalent to that of FIG. 2 and is distinguished from the latter by a greater rigidity determined by the layer having Kevlar fibers.

Figure 7:
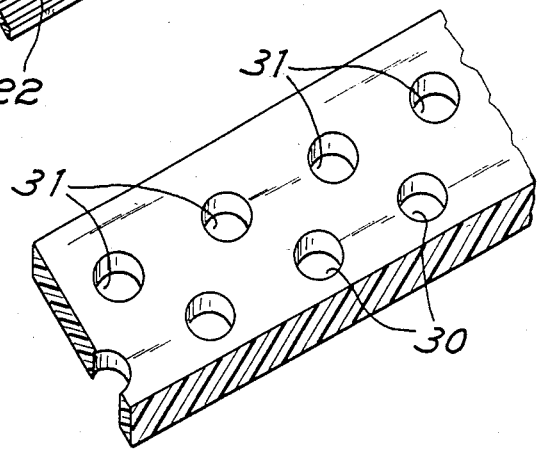
FIG. 7 shows in a perspective view a still further embodiment of the belt having openings arranged on a plurality of parallel rows.

FIG. 7 shows a belt similar to the belt of FIG. 2, with the difference that it comprises a plurality of openings 30 and 31 arranged in parallel rows, preferably with the openings offset from one another, as shown in the Figure.

The belt of FIG. 7 may be favorably used for engaging with the pulleys comprising teeth disposed in parallel rows and similarly offset from one another, when a transmission of greater power is involved. Indeed, said rows of openings may be, for instance, more than two. According to the main principle of the invention, said openings disposed on parallel rows must be arranged in such as way as to leave longitudinally between one row of openings and the other a continuous space without any kind of interruption, said space being necessary for the presence of reinforcing continuous elements directed along the longitudinal direction of the belt.

Figure 8:
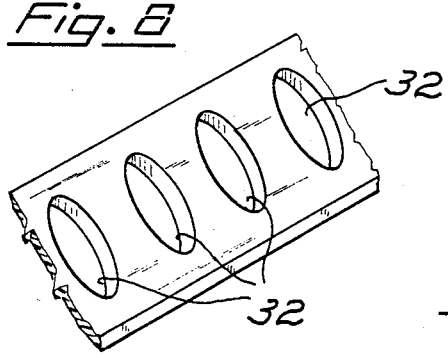
FIGS. 8 and 9 show in perspective view different embodiments relating to the openings provided in the annular body of the belt.

According to further embodiments, the openings in the belt may have contours different from circular. For instance, FIG. 8 represents a belt characterized in having openings 32 with an oval-shaped contour, and therefore very extended in a direction transverse to the belt in order to reduce the specific pressure due to the engaging of the pulley tooth with the belt opening.

Figure 9:
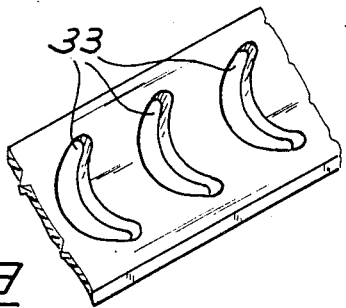

Furthermore, the contour of the openings passing through the annular body may be still very extended in a transverse direction to the belt with a substantially semi-circular shape, as shown in FIG. 9 by reference number 33. This shape is permissible only when the belt moves in only one running direction.

Up to now the various embodiments of the belt according to the present invention have been shown with holes or openings passing entirely through the thickness of the belt.

However, the principle of the invention includes the embodiments in which there are non-through or partial openings, obtained with small milling cutters or by appropriate molding of the articles.

For instance, in the case of a belt adapted to be engaged on both faces, the openings are extended from each face up to the central plane of the center line, in practice, with the bottom of the openings delimited by said plane of the center line where are disposed the longitudinal elements. Said openings could extend to the reinforcing layer nearer the belt face without reaching any reinforcing element.

According to said alternative embodiment, FIG. 10 represents a belt equivalent to that of the preceding Figures, with the difference that the openings 34 are not throughopenings, as can be noted by observing the layer provided with longitudinal cords and the outer covering placed on the face opposite to the engaging one, provided also with anti-abrasive fabric.

FIG. 11 represents a belt comprising openings 35 provided on the face 36, which is adapted to contact the pulley; as shown, said openings are not through-openings and with their base they do not reach the longitudinal cords 37 and the cords 38 inclined with respect to the longitudinal direction of the belt.

FIG. 12 represents a belt substantially similar to those which have been described up to now, with the difference that the reinforcing layers 39 and 40, having cords 41 and 42 symmetrically inclined with respect to the longitudinal direction, are in contact with the opposite faces of the layer 43 comprising longitudinal cords 44.

The belt comprises a further layer having transversal cords in contact with the covering layers, as clearly shown in that figure.

The openings 45 of the belt, instead of being through-openings as in FIG. 12, could be non-through-openings for instance, as indicated in FIGS. 10 and 11.

In one particular embodiment, the belt is characterized by a reinforcing structure comprising still continuous longitudinal elements and, as elements inclined with respect to the longitudinal direction, cords or filaments of a fabric. The fabric of threads having the same resistance in weft and warp, for instance having cotton, polyester or Kevlar cords, is cut according to known techniques with angles of about 45° with respect to the warp direction and then it is drawn so as to form, during the application of the belt, a plurality of lozenges whose sides have substantially the above-specified directions inclined with respect to the longitudinal direction of the belt. The fabrics may be more than one in order to increase the resistance capacity of the whole belt. Preferably, the fabric is a rubberized fabric or a fabric impregnated with liquid rubber or rubber in solution.

In all the cited embodiments there are found some preferred relationships amongst certain geometrical parameters of the belt.

As shown in FIG. 13, if the distance between two successive belt openings is indicated by P and if the diameter of each opening of the belt is indicated by D, said distance P may be related to the diameter D according to the following interval or range of values:

$$P = 1.25 \, D \text{ and } 2.5 \, D$$

This relation is valid also in the case of an opening having a contour different from circular, in this case indicating by D the maximum dimension of the opening in the longitudinal direction of the belt.

In particular, the longitudinal continuous lateral portions of the belt in respect of the openings have a width l referred to the total width L in the interval or range:

$$l = 0.1 \, L \text{ and } l = 0.40 \, L$$

The behavior of the belt under stresses during the transmission of motion will now be described.

In this situation, the segment of the belt shown in FIG. 13 is stretched between driving pulley and driven pulley; in fact, the openings of the belt portions (not shown) engaging with the driving and driven pulleys put into traction the inextensible longitudinal cords that constitute an anchoring system with a practically unchanged configuration with respect to the openings disposed in central position with respect to the belt in the portion considered in that figure.

Supposing that the opening 46 is subjected to the resulting thrust F transmitting by a pulley tooth, said stress will be transmitted to the cords 48, 49 through the cord 47; in their turn said cords 48, 49 will unload or transmit in equal parts the whole stress onto the longitudinal cords 50, 51.

The transmission of the stress between the cords 48, 49 with respect to each other and the longitudinal cords 50, 51 is complete and immediate, since all the cords are practically directly in contact with one another and mutually bound by the cross-linking of the elastomeric material embedding said cords.

In the transmission of the stress from the walls of the opening to the longitudinal cords, there occurs a transmission of transversal components of modest value and such as not to alter substantially the parallelism of the longitudinal cords. This characteristic results from the choice previously described for the angles of inclination of the cords crossed to each other in the two adjacent layers of the reinforcing structures of the belt.

Consequently, deformation of the contour profiles of the belt openings are avoided, and since the openings which are not yet engaging a pulley remain with unchanged configurations, at the right moment (i.e., at the beginning of contact) they have a correct and gradual engagement with the teeth of the pulleys.

The belt has the advantage of being readily able to be manufactured on an industrial scale, utilizing equipment already known in the technique, mainly a building-up drum and a vulcanizer.

The building-up drum has a cylindrical shape, is of the collapsible type, and has a width sufficient for manufacturing various belts contemporaneously.

On the building-up drum put into rotation there are gradually wound the various strips shown in the figures of the present specification, up to a number forming a cylindrical sleeve subsequently cut with appropriate knives according to contiguous planes perpendicular to the axis of the drum. In this way, the cylindrical sleeve formed on the drum is divided into a plurality of belts placed side-by-side.

Vulcanization may be carried out, for instance, by introducing the building-up drum into suitable tanks in which there is placed a flexible membrane pushed against the outer surface of the belts to guarantee a uniform and sufficient molding pressure during the vulcanization.

The perforations necessary for forming the openings through the annular body of each belt are made on the vulcanized product.

Alternatively, the openings through the belt may be made by processes for molding the elastomeric material of the belt around a central core, internal to the mold, and comprising suitable projections adapted for determining the desired contour of the openings.

The belts of the present invention, owing to the characteristic of high flexibility and light weight, have numerous advantages; in fact, the presence of textile cords or discontinuous Kevlar fibers permits the belt body to adapt to any sudden variation in the alignment of the pulley shafts forming a part of the transmission; for instance, in consequence of jerks, when the belt constitutes one of the components of a motor vehicle.

In practice, the belts according to the present invention have a flexible rigidity practically negligible in a longitudinal direction.

This characteristic depends not only on the particular use of flexible elements, generally textile cords, but further on the width of the openings obtained in the annular body. In other words, the recourse to elastomeric materials helps to determine a very high flexibility and light weight through the alternations of openings and empty spaces.

In consequence of the cited characteristics of high flexibility and light weight, the belt according to the present invention is therefore adapted to any desired run between pulleys having shafts disposed in any way whatsoever.

In particular, thanks to the characteristic of being so light, the belts according to the present invention are practically devoid of high intensity mechanical vibrations.

The light weight is still more favorable in the driving belts according to the present invention that are adapted to operate on both faces.

The advantage is evident in relation to conventional toothed belts in which the masses transported on both the faces being constituted by teeth projecting with respect to the annular body, are significantly greater than those of the present belt.

A further advantage of this invention resides in the easier and more economical formation of the belts herein described with respect to toothed ones in cases in which it is desired to provide a product adapted to engage on both the faces. In fact, in the conventional "bi-toothed" belts it is possible for some applications to encounter problems in the alignment of the upper and lower teeth during the manufacturing process. In the belts of the present invention, however, the perforations through the thickness of the belt with the consequent formation of through-openings permits a precise alignment between the parts adapted to engage on both faces of the belt.

Then there are facilitated for obvious reasons, in particular the flat shape of the belt, the lacing operations; therefore, there is favored the manufacture of said types of belts, also on a plane, with unlimited lengths.

What is claimed is:

1. A flat belt for transmitting motion between two pulleys comprising an annular body of elastomeric material, said belt being characterized in comprising a flat-shaped annular body, reinforced with continuous flexible elongated elements resistant to traction, directed in the longitudinal direction of the belt and embedded in the elastomeric material, at least a plurality of openings obtained in said annular body aligned in the longitudinal direction of the belt to engage with corresponding protuberances on the pulleys, said openings engaging partially a length of said belt from side to side, said annular body being provided with reinforcing elements directed in parallel with respect to one another in a first direction inclined with respect to the longitudinal direction of the belt and further reinforcing elements directed in parallel to one another in a second direction inclined with respect to the longitudinal direction of the belt in a substantially symmetrical way with respect to the first direction, said elements directed in said first direction and said elements directed in said second direction constituting an indeformable reinforcing structure closely arranged around said openings, said elements directed in said first direction and said elements directed in a second direction transmitting stresses from said openings to said continuous elements directed in said longitudinal direction of said belt.

2. A belt for transmitting the motion between two pulleys defined as in claim 1, characterized in that said openings are through-openings.

3. A belt as defined in claim 1, characterized in that said reinforcing elements directed in the two cited directions are symmetrically inclined with respect to the longitudinal direction of the belt with angles between 10° and 50°.

4. A belt as defined in claim 1, characterized in that said reinforcing elements are flexible elongated elements in the form of cords, filaments or the like.

5. A belt as defined in claim 1, characterized in that said reinforcing elements are in the form of discontinuous fibers directed along the said directions inclined with respect to the longitudinal direction of the belt.

6. A belt as defined in claim 1, characterized in that said reinforcing elements are disposed on two layers, the reinforcing elements of the two layers being symmetrically inclined with respect to the longitudinal direction of the belt.

7. A belt as defined in claim 1, characterized in comprising flexible elongated elements resistant to traction embedded in the said annular body, directed transversely to the longitudinal elongated elements.

8. A belt as defined in claim 1, characterized in comprising flexible elongated elements resistant to traction arranged in a central plane at one-half of the thickness of the annular body and further layers having reinforcing elements in a position substantially symmetrical with respect to said central plane.

9. A belt as defined in claim 1, characterized in comprising an anti-abrasive covering on the surface of said annular body apt to contact said pulleys, parts of said anti-abrasive covering being introduced into said belt openings.

10. A belt as defined in claim 1, characterized in that said annular body comprises a plurality of openings arranged one after another in parallel rows, between said rows there being interposed a continuous longitudinal zone without any kind of interruption, continuous longitudinal elements being disposed in said zone.

11. A belt as defined in claim 1, characterized in comprising a fabric of threads having the same resistance in weft and warp stretched in the longitudinal direction in which the reinforcing elements of the fabric are directed substantially along the said first and second directions.

12. Transmission provided with belt and pulleys, characterized in comprising a belt as defined in claim 1 and at least a pair of pulleys having protuberances for engaging with the openings of the belt.

* * * * *